UNITED STATES PATENT OFFICE.

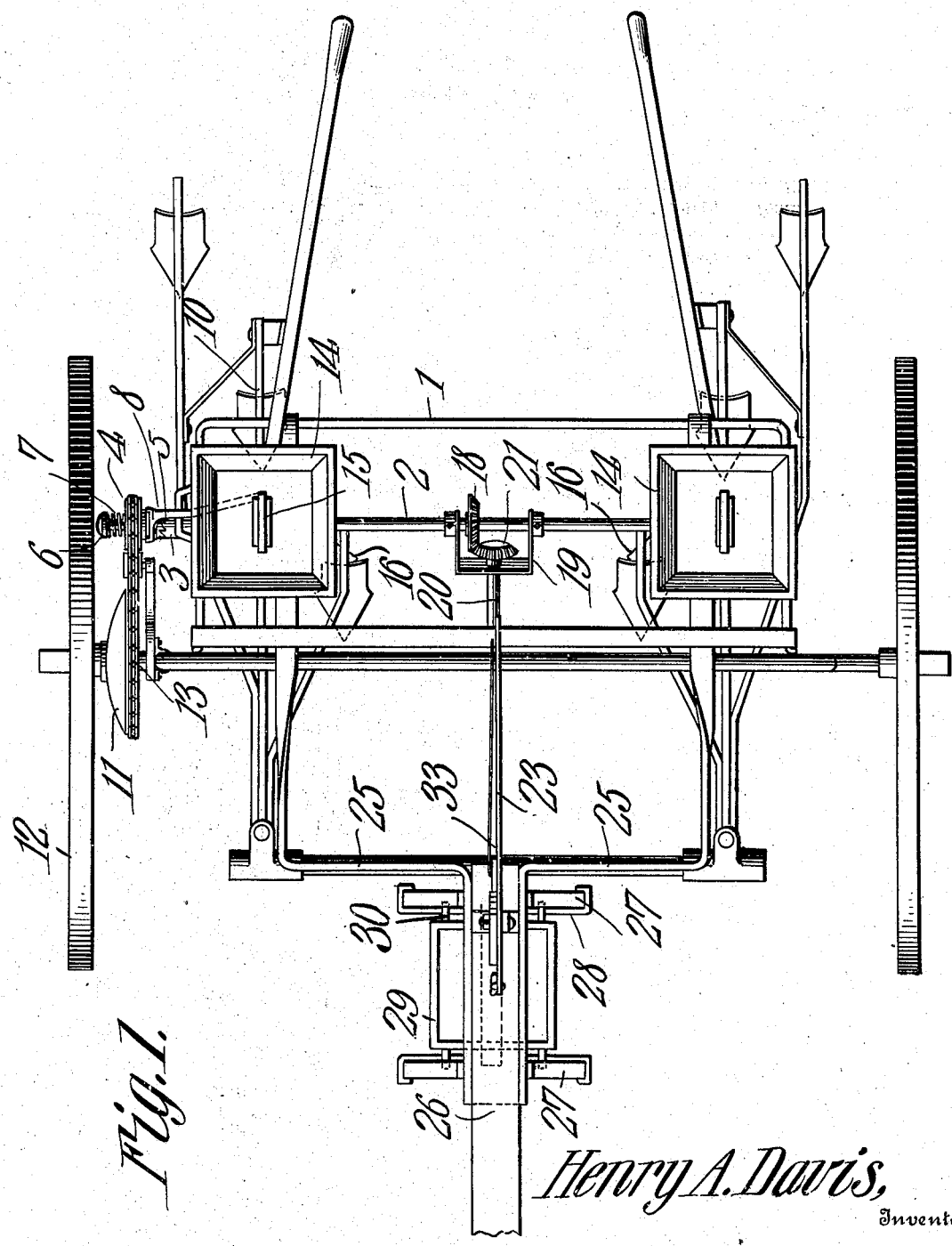

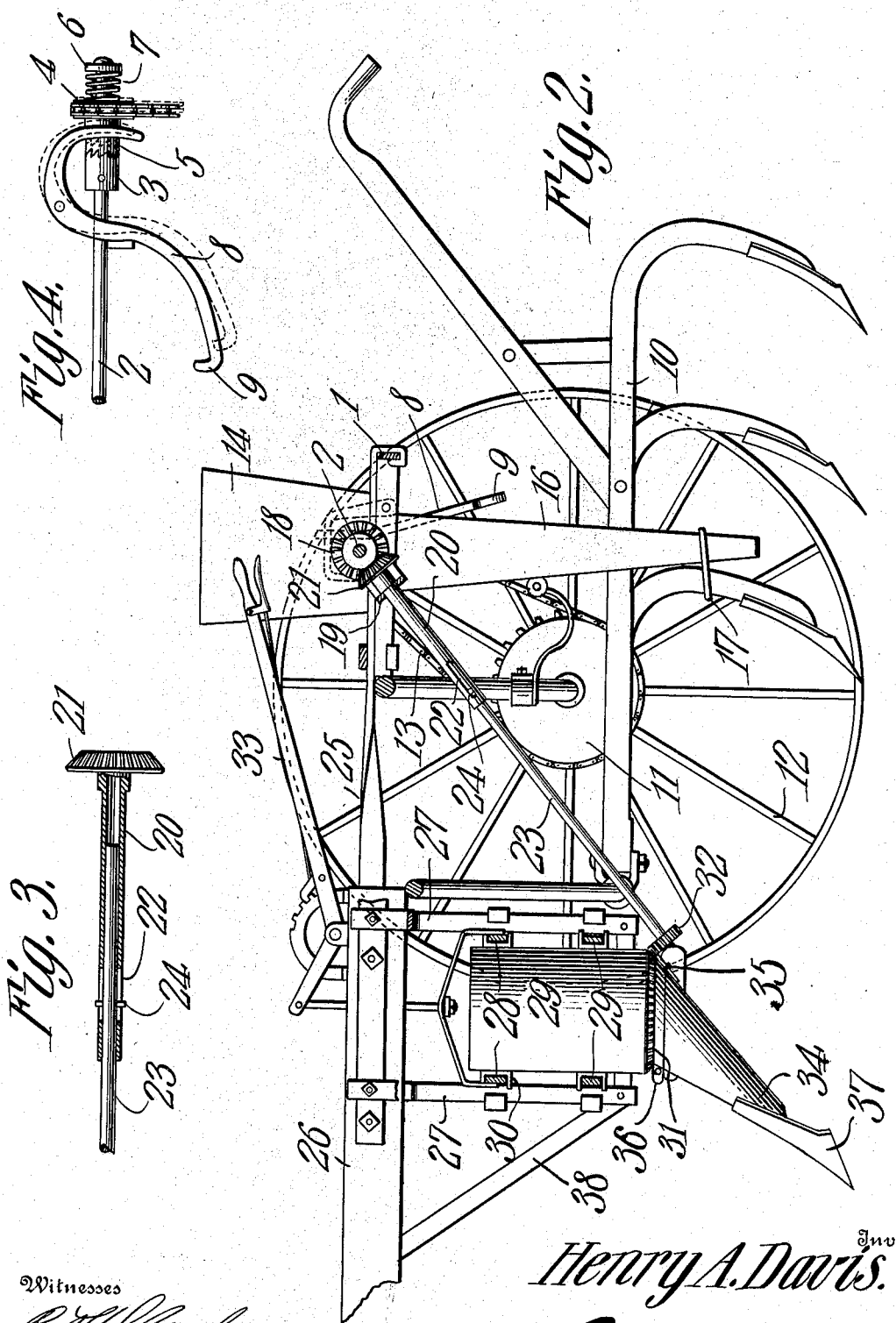

HENRY ABIJAH DAVIS, OF MURFREESBORO, ARKANSAS.

CULTIVATOR ATTACHMENT.

No. 885,228.  Specification of Letters Patent.  Patented April 21, 1908.

Application filed September 16, 1907. Serial No. 393,155.

*To all whom it may concern:*

Be it known that I, HENRY A. DAVIS, a citizen of the United States, residing at Murfreesboro, in the county of Pike and State of Arkansas, have invented a new and useful Cultivator Attachment, of which the following is a specification.

This invention has relation to cultivator attachments and it consists in the novel construction and arrangement of its parts as hereinafter shown and described.

The object of the invention is to provide an attachment adapted to be applied to a cultivator and which is provided with a plurality of hoppers two of which are elevated and fixed at the sides of the attachment while the third is located in a lower plane and is adjustably mounted at the middle of the attachment. The attachment is provided with a rotating shaft which is operated through the instrumentality of one of the supporting wheels of the cultivator, and the dropping mechanisms of the said hoppers are operatively connected with the said shaft. A clutch mechanism is provided for throwing the said shaft in or out of gear and a clutch lever forms a part of the clutch mechanism and is provided with a hooked end adapted to receive one of the beams of the cultivator, the weight of which will hold the said clutch lever in such position that the clutch members will be held out of engagement with each other and the said shaft will remain in a state of rest.

With this attachment it is possible to fertilize a crop as the seed is planted, the intermediate hopper being used for dropping the seed and the side hoppers for dropping the fertilizer. Both the seed and the fertilizer are covered with earth by the shovels of the cultivator.

The attachment may also be used to plant an auxiliary crop, such as peas, in combination with corn, when the corn is being cultivated for the last time. When this is done the intermediate hopper is not used and the side hoppers are filled with peas which are deposited as seed at either side of the row of corn as the said corn is being cultivated.

In the accompanying drawing:—Figure 1 is a top plan view of the attachment applied to a cultivator. Fig. 2 is a sectional view of the same. Fig. 3 is a sectional view of means for operating one of the hoppers of the attachment, and Fig. 4 is an elevation of a clutch mechanism used upon the attachment.

The attachment consists of a substantially rectangular frame 1 in which is journaled a shaft 2. A clutch member 3 is fixed to the shaft 2 and a sprocket wheel 4 is mounted upon the said shaft and is provided with a clutch hub 5 which is adapted to coöperate with clutch member 3. A disk 6 is fixed to the end of the shaft 2 and a coil spring 7 is interposed between the disk 6 and the side of the sprocket wheel 4. The spring 7 is under tension with a tendency to hold the clutch hub 5 of the wheel 4 in engagement with the clutch member 3. When this is the case the shaft 2 rotates with the wheel 4. When such is not the case the shaft 2 is at rest.

A lever 8 is fulcrumed upon the frame 1 and is provided at one end with a hook 9 which is adapted to receive and support one of the beams 10 of the cultivator. The opposite end of the lever 8 engages the wheel 4 and is adapted to move the same away from the clutch member 3. The dished sprocket wheel 11 is attached by means of a set screw or otherwise to the hub of one of the supporting wheels 12 of the cultivator. The sprocket chain 13 passes around the sprocket wheels 4 and 11. The sprocket wheel 11 is dished in order that the chains 13 may operate nearer the center of the cultivator. The hoppers 14 are fixed to the frame 1 near the sides thereof and the shaft 2 is provided with the droppers or separators 15, one of which is located in each of the hoppers 14. Each hopper is provided with a flexible depending chute 16 and each said chute is connected by a link 17 with a forward standard of each gang of shovels of the cultivator and immediately behind the forward shovel of the gang, so that the material that passes from the hoppers 14 is deposited in the furrows opened by the forward shovels of the cultivator and is covered by earth thrown up by the rear shovels of the cultivator. The beveled gear wheel 18 is attached to the shaft 2 at an intermediate point of the same. The yoke 19 is also attached to the shaft 2. The sleeve 20 is journaled for rotation in the yoke 19 and is provided with a beveled gear wheel 21 which meshes with the beveled gear wheel 18. The sleeve 20 is provided in its sides with the elongated openings 22 and one end of the shaft 23 enters the said sleeve and is adapted to slide therein and is provided with a cross pin 24 which operates in the elongated openings 22 of the sleeve 20. The yoke pieces 25 connect the frame 1 with the pole 26 of the cultivator. The yokes 27 depend from the pole 26 and are provided with the cross guides 28. The hopper 29 is mounted between the yokes 27 and the cross guides 28 and is provided upon its exterior with ears 30 which operate upon the cross guides 28. The hopper 29 is provided in its bottom with a dropping mechanism 31 which is operated by the gear wheel 32 attached to the shaft 23. The cross guide 28 may slide longitudinally of, or vertically along, the yoke 27 and a lever 33 is fulcrumed to the pole 26 and its working end is connected with the hopper 29. By manipulating the lever 33 the hopper 29 may be raised or lowered and during such movement the slip-joint connection between the shaft 23 and the sleeve 20 permits of such movement and at the same time the shaft 23 continues to rotate with the said sleeve through the instrumentality of the openings 22 and the cross pin 24. The hopper 29 is provided with a depending chute 34 which is made in sections hinged together at 35. The snapping pin 36 holds the sections of the chute 34 in alinement with each other. A plow point 37 is attached to the lower end of the lower section of the chute 34. The brace 38 connects the lower ends of the yokes 27 with the pole 26. Thus the contents of the hopper 29 is deposited in the furrows opened by the plow point 37 and is covered by the permanent blades of the cultivator. Should the plow point 37 strike an obstruction the pin 36 will break and the lower section of the chute 34 will swing to the rear on the hinge 35 without being damaged or bent.

From the foregoing description it is obvious that the attachment may be used upon a cultivator and that it may be used to fertilize a crop at the time that the seed is planted or it may be used to plant a supplemental crop at the time that the main crop is being cultivated for the last time.

The attachment is of simple construction and its parts are so arranged that it is counterbalanced upon the cultivator and thus does not add excessive weight to the pole.

If desired, the positions of the sleeve 20 and shaft 23 may be reversed without departing from the spirit of the invention.

Having described my invention what I claim as new and desire to secure by Letters-Patent is:—

1. A cultivator attachment comprising a frame, a shaft journaled for rotation upon the frame, a plurality of hoppers mounted upon the frame, two of which are in fixed position while the third is adjustable, each of the said hoppers having dropping mechanism operatively connected with the shaft.

2. A cultivator attachment comprising a frame, a shaft journaled for rotation on the frame, a plurality of hoppers mounted upon the frame, two of which are in elevated fixed positions at the sides of the frame while the third is adjustably located at the middle of the frame, each of said hoppers having a dropping mechanism which is operatively connected with the shaft.

3. A cultivator attachment comprising a frame, a shaft journaled for rotation on the frame and adapted to receive its rotary movement from the wheel of the cultivator, a clutch mechanism and clutch lever for throwing said shaft in and out of gear with the wheel of the cultivator, the end of the clutch lever being hooked and adapted to support one of the beams of the cultivator, whereby, the said shaft is thrown out of gear with the wheel of the cultivator, a plurality of hoppers mounted upon the frame, each said hopper having a dropping mechanism which is operatively connected with the shaft.

4. A cultivator attachment comprising a frame, a shaft journaled for rotation on the frame, a plurality of hoppers mounted upon the frame and each having a dropping mechanism which is operatively connected with the shaft, one of said hoppers being vertically and transversely adjustable with relation to the line of draft of the cultivator.

In testimony that I claim the foregoing as my own, I have hereto affixed my signature in the presence of two witnesses.

HENRY ABIJAH DAVIS.

Witnesses:
JOSEPH C. PINNIX,
JESSE N. RILEY.